United States Patent Office 3,480,765
Patented Nov. 25, 1969

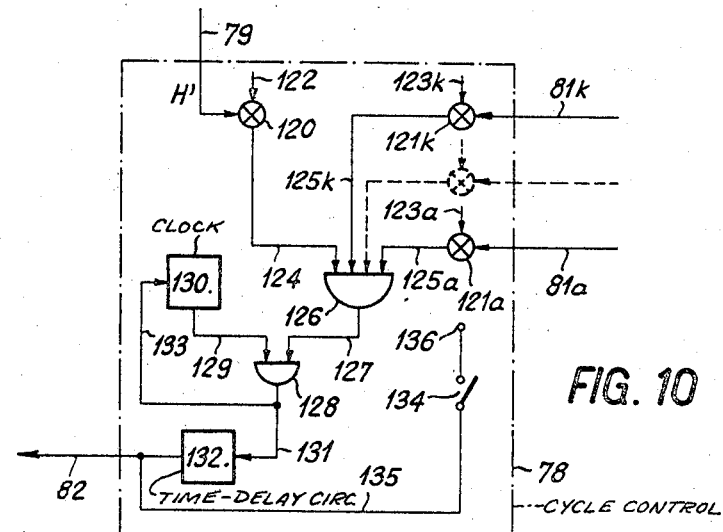
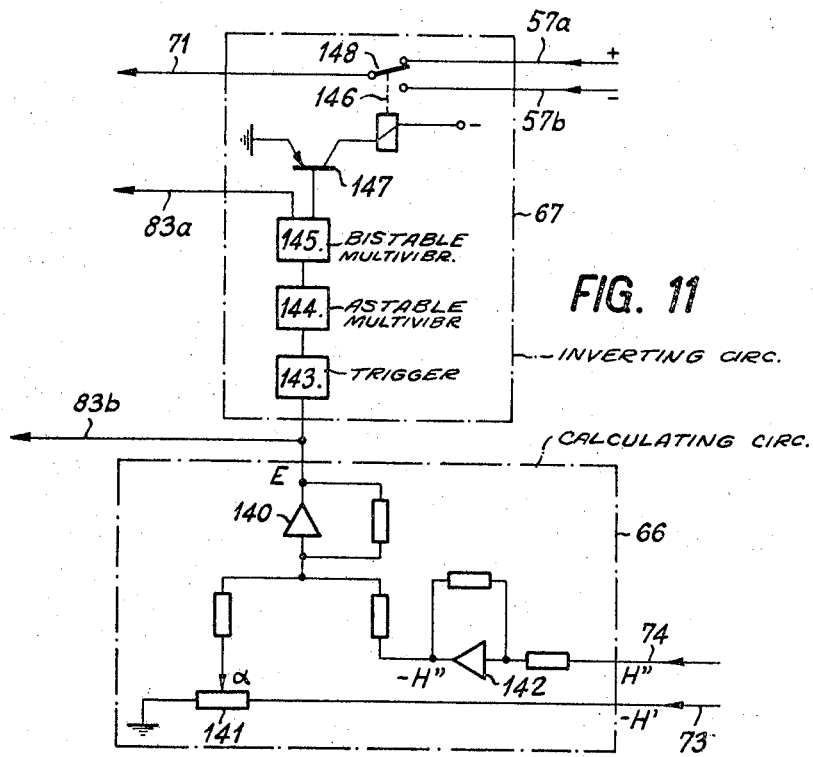

3,480,765
APPARATUS FOR CONTROLLING AN INDUSTRIAL INSTALLATION
Roland Rouxel, Troinex, Geneva, Switzerland, and Jean G. Helein, Fresnes, France, assignors to Battelle Memorial Institute, International Division Compagnie Francaise Thomson-Houston, Geneva, Switzerland, a corporation of Switzerland
Filed Apr. 14, 1965, Ser. No. 448,068
Claims priority, application Switzerland, Apr. 14, 1964, 4,742/64
Int. Cl. G06f *15/18;* G06c *27/00*
U.S. Cl. 235—150.1                                6 Claims

ABSTRACT OF THE DISCLOSURE

An apparatus for the oscillatory control of an industrial installation, the operation of which is governed by actuating variables and is defined by a final controlled variable depending on physical quantities measured in the installation. The apparatus is connected to the installation through measuring elements which supply signals representing the value of the measured quantities and the value of disturbances and is also connectable to the installation through the intermediary of actuators arranged to vary the actuating variables.

---

This invention is concerned with the control of an industrial installation.

Many oscillatory control systems have been proposed over the past few years for controlling not merely a single machine or even a group of machines but entire industrial installations. In oscillatory control systems, a distinction should be made between:

(a) Those seeking to impose on the installation operating conditions expressed by an operating criterion (also termed "final controlled variable"), i.e. a well-defined mathematical function of the actuating variable reaching and sticking to a predetermined value, defined quantitatively in an absolute manner.

(b) Those seeking to impose on the installation operating conditions which are defined by the performance it is desired to achieve, which performance is defined quantitatively in a relative manner only. Control systems of this latter type include the so-called "optimalizing" control systems which seek to extremalize the operating criterion, such as for instance efficiency, consumption, or price, in which such extremalization constitutes a relative definition of the value, the extremum of a quantity having only a relative meaning, i.e. being defined solely in relation to neighboring values, and not in an absolute manner.

If the static characteristic of the installation is known and if the latter is not subject to disturbances, control, whether in the usual manner, or through optimalization, consists in giving to the different actuating variables set values which correspond to the selected point of operation, i.e. the desired value of the operating criterion. Knowledge of the static characteristics presupposes however that it has been possible either empirically to determine the operating conditions of the installation in terms of all actuating variables likely to influence operation thereof, or to set up a mathematical model of the installation and to resort to a computer to work out for each actuating variable individual set values. Whenever the operation of the installations is dependent on a large number of variables and whenever the latter may be subject to random fluctuations constituting disturbances, such control systems are no longer applicable, either because it is no longer possible to determine the influence of all variables or because it is impossible to set up, in view of its complexity, the mathematical model of the installation. It then becomes necessary to resort to other control systems. Of these systems, the oscillatory control systems are best known. In this connection, reference may be made, in addition to the three classes mentioned by Y. T. Li in his paper entitled "Optimalizing System for Process Control" (published in "Instruments" 25, 1952, Part I: January, pp. 72–77; Part II: February, pp. 190–193 and 228; Part III: March, pp. 324–327, 350 and 352), to the particular optimalizing control system by oscillation disclosed in U.S. Patent No. 3,346,726. As is known, oscillatory control consists in bringing the actuating variables towards their set values by superposing variations on their actual value with the direction of these variations being reversed at instants that are determined by the inherent dynamic characteristic of the installation. It therefore becomes necessary for these oscillations to be maintained until they tend towards boundary oscillations having a frequency and an amplitude which are related to the corresponding set values through the intermediary of the dynamic characteristic of the installation. This procedure is therefore time consuming since the oscillations may last a long time before the boundary oscillations are reached; the time that is required is all the longer when the point of optimal operation is more remote from the point of instantaneous operation that is reached when control comes into operation.

An object of the invention is to enable the duration of the oscillatory state to be limited and consequently to cause the actuating variable (hereinafter sometimes called action quantities) to ten to attain more rapidly than in the above method, their operating values, while still achieving for this control sound accuracy and satisfactory behavior in the face of disturbances, both slow and quick.

An object of the invention is to enable the duration of the oscillatory state to be limited and consequently to cause the action quantities to tend to reach more rapidly than in known methods towards their operating values, while still achieving for this control good accuracy and satisfactory beheavior in the face of disturbances, both slow and quick.

The invention applies to any industrial installation of which the operation, governed by a set of freely variable actuating variables, is defined by the value of a final controlled variable chosen as representing an operating criterion. A first actuating variable is firstly varied by subjecting it to oscillatory variations of which the direction is reversed at given switching instants (selected according to a given switching law) and which together form a control sub-sequence in relation to this first actuating variable. Each actuating variable is varied in said manner that constitutes a plurality of sub-sequences forming together a control cycle, successively passing from one actuating variable to the next being operated at particular instants. Similar control cycles are repeated until the installation reaches the desired working conditions, and these control cycles together form a control sequence. In the course of each sub-sequence, a set value is calculated from so-called significant values through which the corresponding actuating variable passes at particular switching instants of its sub-sequence and this actuating variable is caused to have a value equal to said set value, the sub-sequence being interrupted as soon as this set value is reached and the control sub-sequence for the next actuating variable being immediately initiated. After completion of a first control cycle, a pause of predetermined duration is made in the course of which the actuating variables are kept invariable; and, at the end of said pause, a test is made on said final controlled variable: as long as the result of this test is unfavorable, control sequences are carried out by repeating similar control cycles; when the result of the test is favorable, similar control sequences are periodically triggered off. When a disturbance occurs, exceeding a predetermined threshold and lasting longer than a predetermined time, a new control sequence is initiated.

The invention accordingly provides an apparatus of oscillatory control of an industrial installation, the operation of which is governed by actuating variables and is defined by a final controlled variable depending on physical quantities measured on said installation, said apparatus being connectable to said installation through measuring elements arranged to supply signals representing the value of the measured quantities and the value of disturbances and through the intermediary of actuators arranged to vary the actuating variables, and said apparatus comprising a first calculation element capable of elaborating from said measured quantities the instantaneous value of the final controlled variable, a second calculation element capable of elaborating the value of the successive time-derivatives of said instantaneous value of the final controlled variable to at least the order two, a correction element capable of elaborating a correction signal representing the speed of variation of each said actuating variables, a stepping motor and capable of conveying said correction signal along different paths each ending at one of said actuators, a switching element having a calculation circuit capable of determining from said time-derivatives the consecutive switching instants at which the sign of said correction signal should be reversed and a reversing circuit capable of carrying out this reversal at said switching instants, and a third calculation element capable of elaborating the time-integral of said correction signal, said apparatus being characterized in that it includes a monitoring stage comprising:

A second selection device having its advance controlled in synchronism with that of the first said selection device and being adapted to take up the signals generated by said third calculation element and to convey said signals along a feedback line.

A sub-sequence controlling device which causes said stepping motor to advance and which comprises: a triggering circuit connected to said switching element and arranged to generate a control signal at each of said particular switching instants; a memory calculation circuit connected to said feedback line and to said triggering circuit and arranged to memorize the significant values reached by the actuating variable when said control signals appear and to elaborate a set value equal to a linear combination of said significant values; and a comparing circuit connected to said feedback line, to said memory calculation circuit and to said triggering circuit, and arranged to generate, when the actuating variable reaches said set value, an end of sub-sequence signal causing the stepping motor to advance by one step, thereby to initiate a fresh regulating sub-sequence; and A cycle controlling device which initiates the starting of said stepping motor and which comprises: a series of threshold comparators with at least one of said comparators having its input connected to said second calculation element and with the remainder of said comparators having their inputs connected to said disturbance measuring elements; a timer supplying periodic signals; a first OR element whose inputs are connected to said threshold comparators; a second OR element having one input connected to the output of said first OR element and having its other input connected to the output of said timer; and a time delay circuit which is connected to the output of said second OR element and which is capable of supplying, with a delay equal to its time delay, a cycle or sequence triggering signal causing stepping motor to be started, thereby to initiate a fresh regulating cycle or sequence.

For a better understanding of the invention and to show how it may be carried into effect, the same will now be described by way of example with reference to the accompanying drawings, in which:

FIGURES 9 to 11 show three parts of the apparatus in greater detail.

The method according to the invention is suitable for the control, in the broadest meaning of the word, of an industrial installation. In particular, the method enables so-called optimalizing control of the installation, in other words to achieve optimum performance thereof, said optimum performance being defined by the fact that the operating criterion (or final controlled variable) achieves an extremal (i.e., either maximum or minimum) value.

To describe this method, reference will be made, by way of example, to the case in which it is desired to achieve optimum performance of the industrial installation and it will be supposed that this optimum performance corresponds to a minimum of the operating criterion (final controlled variable) F. This does not constitute a restriction since it is always possible to search a minimum. If the optimum performance corresponds to the maximum of the criterion F, it suffices indeed to consider the opposite quantity $-F$. It will be assumed, for this particular case of optimalizing control, that the selected switching law consists in taking as switching instants those when a control quantity, for instance one of the successive time-derivatives of the instantaneous value H the operating criterion (final controlled variable) F, or a function of these derivatives, passes from a negative value to a positive value (so called "natural switching"), and, when the value of this control quantity remains positive, periodically repeating instants (so called "forced switching"). It will be supposed that the direction in which an action quantity varies is favorable if the control quantity has a negative value and that this direction is unfavourable when this control quantity has a positive value.

The control method according to the invention is particularly suitable for the control of an installation whose operation is governed by several action quantities. However, in an endeavour to simplify the description, reference will be made to the case in which the operation of the industrial installation is governed by a single action quantity, that will be designated by $x_1$, and in which the control quantity will be the first time-derivative of the instantaneous value H (which is measurable) of the final controlled variable F. The difference between H (dynamical behavior) and F (statical behavior) being due to the time-constants that affects the process.

Figure 1:
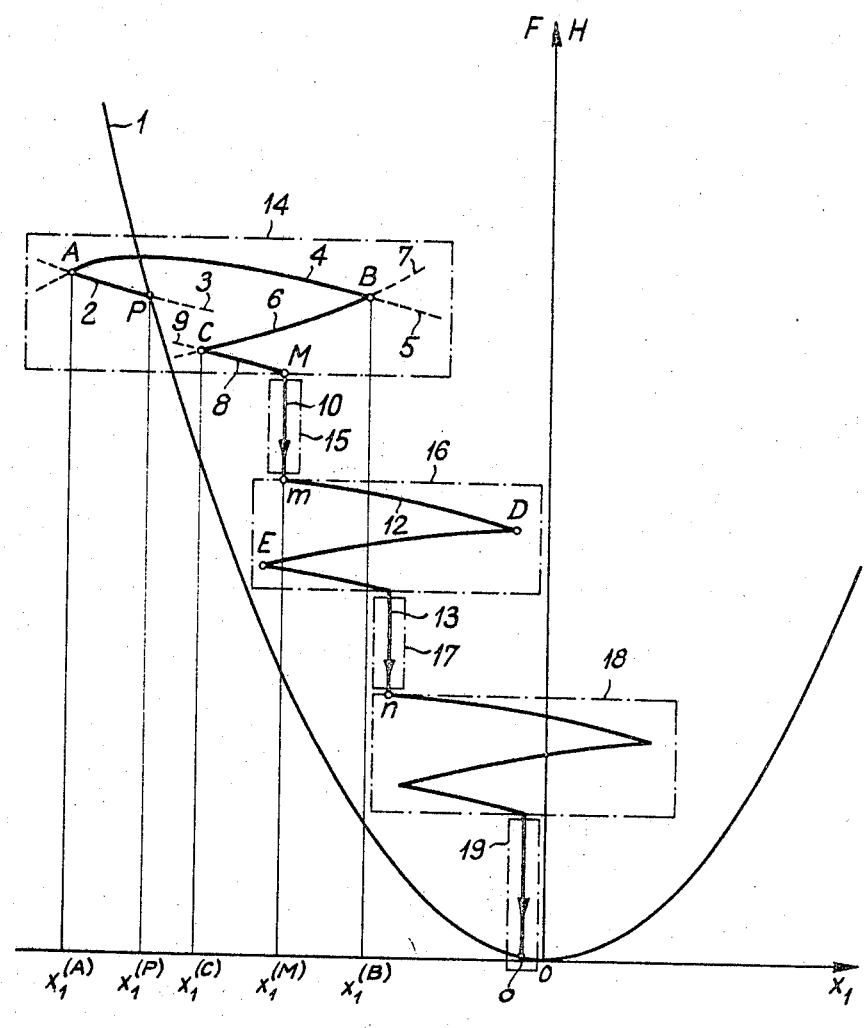
FIGURE 1 shows, in a very simple case, various control stages in accordance with the method.

Such an installation has a static characteristic in the form of a curve having a minimum corresponding to optimum performance. This static characteristic, e.g. curve 1 in FIGURE 1, represents the value of the statical final controlled variable $F(x_1)$ as a function of the values of the actuating variable $x_1$. It will be supposed that when control is being initiated, the representative point is located at P, the actuating variable having a value $x_1^{(P)}$. A first variation is imparted to quantity $x_1$ at a given speed, which variation causes the representative point to travel over an arc 2 of the dynamic characteristic 3 passing through point P. At a particular instant, determined by the adopted switching law, the direction of this variation is reversed; the representative point, which has reached, along dynamic characteristic 3, a point A corresponding to the value $x_1^{(A)}$ of the actuating variable, will travel along an arc 4 of another dynamic characteristic 5 corresponding to the new direction of variation. At a subsequent instant, the direction of variation is again reversed and the representative point, having reached, along characteristic 5, a point B corresponding a value $x_1^{(B)}$ of the actuating variable, travels over an arc 6 of a third dynamic characteristic 7, and so on.

It will now be supposed that the variation of the action quantity between point P and A occurred in an unfavourable direction, i.e. the control quantity remained positive. In such a case, provision is made for memorizing the value $x_1^{(B)}$, reached at the end of the second variation represented by arc 4, and the value $x_1^{(C)}$ reached at the following switching instant, represented by point C, for elaborating a set value equal to a linear combination of these values, e.g. the arithmetical mean represented by abscissa $x_1^{(M)} = \frac{1}{2}[x_1^{(B)} + x_1^{(C)}]$, and for arresting the variation of variable $x_1$ when, as the representative point moves along portion 8 of a dynamic characteristic 9, it reaches this index value $x_1^{(M)}$. This succession of variations forms an optimalization sub-sequence, which in the case where there is only one action quantity, coincides with an optimalization cycle. Upon completion of this cycle, represented in FIGURE 1 by the zone 14 marked off in chain-dotted lines, a pause is then made, which pause has a duration substantially equal to the significant time constant of the installation. During this pause, which is represented by zone 15, the variable $x_1$ is kept equal to the set value $x_1^{(M)}$ and the representative point moves closer to the static characteristic 1 along the path represented by arrow 10 and reaches a point $m$. At the end of this pause, an examination is made of the value of the control quantity, i.e. of the first time-derivative of the instantaneous value H of the final controlled variable. If this value of the control quantity is positive, thus indicating a variation in an unfavorable direction, and if it is greater than a previously laid down sensitivity threshold representative of the control sensitivity, a second optimalization cycle is carried out. In FIGURE 1, it has been supposed that such was the case and the second cycle, represented by zone 16, starts off with a first variation, which is supposed to take place in a favourable direction and which is represented by an arc 12. Provision is made in such a case, when the first variation has a favourable direction, for memorizing the value $x_1^{(D)}$ that is reached at the switching instant following this favourable variation and the value $x_1^{(E)}$ that is reached at the next switching instant, for elaborating of a set value $x_1^{(N)}$ equal to a linear combination of values $x_1^{(D)}$ and $x_1^{(E)}$, e.g. the arithmetical mean, and for the interruption of the vraiation of the variable $x_1$ as soon as it reaches this set value. Upon completion of this second cycle 16, a pause, represented by zone 17, is made in the course of which quantity $x_1$ is kept equal to its set value $x_1^{(N)}$ and the representative point moves towards the static characteristic 1 by following the path represented by arrow 13 to reach a point $n$. To determine whether this second cycle has caused the operation of the process to evolute in a favorable direction, an examination is made of the value reached by the control quantity final controlled variable at the end of this pause 17 and, if it differs from zero by a positive value greater than the sensitivity threshold, there is then initiated a third optimalization cycle, represented by zone 18, followed by a pause 19. This control method finally brings the representative point to point $o$, near the minimum 0 of the characteristic, at which point the value of the control quantity is less than the sensitivity threshold, or even nil, thus corresponding to optimal performance of the installation. This plurality of cycles, which, in the described case where there is only one actuating variable involved, coincide each with a sub-sequence, constitutes an optimalization sequence.

In view of the fact that a slow drift can progressively either deform the characteristic 1 or move point $o$ (or both), provision is made for the periodic triggering off of optimalization sequences in order to correct this drift as time goes on. Finally, when a disturbance exceeds a predetermined disturbance threshold and lasts longer than a predetermined duration, a fresh optimalization sequence is triggered off.

As will be observed, the method according to the invention proposes a "strategy" enabling oscillatory control methods, particularly optimizing ones, of an industrial installation rapidly to bring the installation to its desired working by limiting the number of oscillations through computation of a set value for the actuating variable, which computation is made on the basis of the values reached by this actuating variable at particular switching instants selected according to predetermined law of considerations.

Figure 2:
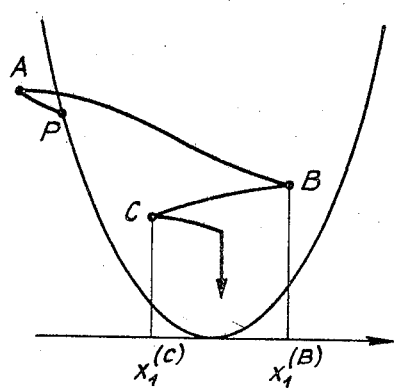
FIGURES 2 to 5 illustrate different variants of these stages.
Figure 3:
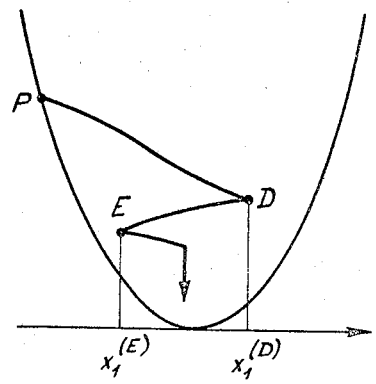
Figure 4:
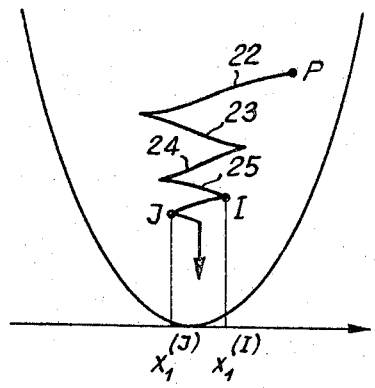
Figure 5:
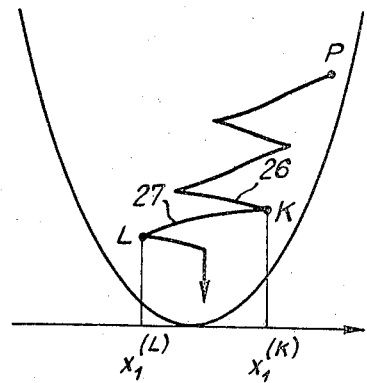

Among the various possible laws of considerations, the more important are, in practice, the following:

(a) When the first variation is unfavourable, i.e. when the control quantity has a positive value during this first variation, which is the case in cycle 14 in FIGURE 1, the value reached by the actuating variable at the instant of switching that follows the second variation, whether this second variation is favourable or not, and the value reached by the actuating variable at the next switching instant, i.e. the values reached at B and C (FIGURE 2), are memorized, and the set value is elaborated on the basis of $x_1^{(B)}$ and $x_1^{(C)}$;

(a1) When the first variation is favourable, i.e. when the control quantity has a negative value during this first variation, which is the case in cycle 16 in FIGURE 1, the values reached by the actuating variable at the instant of switching following this first variation and at the next switching instant, i.e. the values reached at D and E (FIGURE 3), are memorized, and the set value is elaborated on the basis of $x_1^{(D)}$ and $x_1^{(E)}$;

(b) When the first variations are unfavourable, for example those represented by arcs 22, 23 and 24 (FIGURE 4), i.e. when the control quantity has during these first variations a constantly positive value, the switching operations are repeated until a first favourable variation appears, e.g. the fourth, represented by arc 25, in FIGURE 4, the favourable nature of which being indicated by the fact that the control quantity becomes negative, and the values reached by the actuating variable at the instant of switching following this first favourable variation and at the next switching instant, i.e. the values reached at I and J, are memorized, and the set value is then elaborated on the basis of $x_1^{(I)}$ and $x_1^{(J)}$;

(c) When some of the first variations are unfavourable and the others are favourable (FIGURE 5), the switching operations are repeated until two successive favourable variations appear, e.g. the fourth and fifth variations, represented by arcs 26 and 27, in FIGURE 5, and the values reached by the actuating variable at the switching instant between these two successive favourable variations and the next switching instant, i.e. at K, between arcs 26 and 27, and at L, are memorized, and the set value is elaborated on the basis of $x_1^{(K)}$ and $x_1^{(L)}$.

The decision to interrupt a control sequence or to repeat a cycle within this sequence is based on a test of the value of the dynamical operating criterion. In the described example, this test consists in elaborating the first time-derivative H of the instantaneous value H' of the final controlled variable and in comparing the value of this first derivative with a sensitivity threshold: if this value is greater than this threshold, a fresh cycle is initiated within the same control sequence, and if this value is less than the threshold, the sequence is interrupted. This is a particular form of test and other tests may be resorted to, as for example comparing with a sensitivity threshold the value reached at the end of a pause by the second time-derivative H'' of the instantaneous value H of the final controlled variable, or elaborating a linear combination of the first and second time-derivatives of this instantaneous value and comparing with a sensitivity threshold the value reached by this linear combination at the end of the pause. Another possible test consists in elaborating the difference between the values reached by the dynamical operating criterion as such at the beginning of the cycle and at the end of the pause that follows this cycle and in comparing this difference with a sensitivity threshold.

Figure 6:
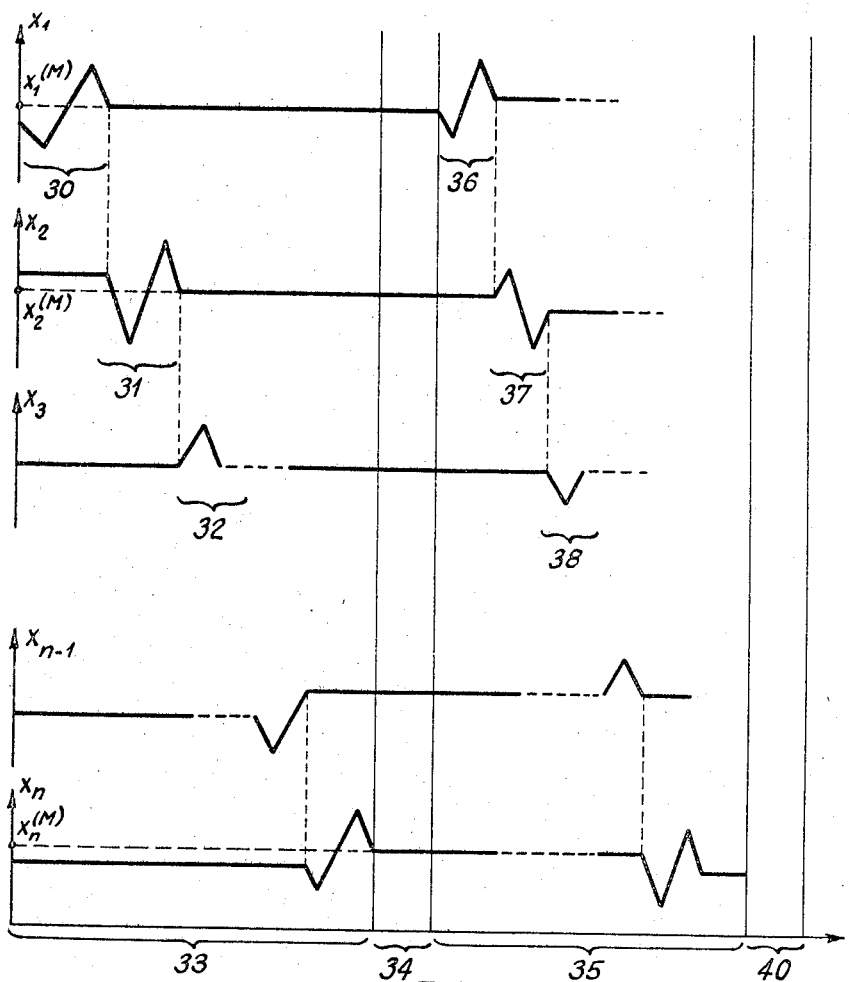
FIGURE 6 shows diagrammatically, in a general case, successive control stages.

In the foregoing, the method has been described with reference to the optimalization control of an installation the operation of which is governed by a single actuating variable. Normally there are several actuating variables $x_i$, and the method consists in acting on each of them in the manner just described for variable $x_1$, action on the variable $x_{i+1}$ being immediately initiated as soon as the action on variable $x_i$ is terminated, this action on an actuating variable forming an optimalization sub-sequence in relation to this variable, and in making a pause upon completion of an optimalization cycle, this cycle being formed by the plurality of sub-sequences corresponding to the several actuating variables. The proposed method thus consists (FIGURE 6) in acting on $x_1$ by subjecting it to an optimalization sub-sequence 30, in immediately passing to action on $x_2$ by subjecting the latter to an optimalization sub-sequence 31 as soon as $x_1$ has reached its set value $x_1^{(M)}$, in passing to optimalization sub-sequence 32 in connection with $x_3$ as soon as $x_2$ has reached its set value $x_2^{(M)}$, and so forth until reaching $x_n^{(M)}$, and in then making, upon completion of the resulting optimalization cycle 33, a pause 34 having a duration substantially equal to the significant time constant of the installation. During this pause, all actuating variables are kept equal to their respective set values, whereas the point representative of the operation of the installation moves progressively closer to the static characteristic of the latter, in the same way as was described in detail with reference to the single actuating variable case. At the end of this pause, the value of the first time-derivative of instantaneous value H of the final controlled variable is compared to that of the sensitivity threshold and a fresh cycle is triggered off if the value of this derivative is greater than this threshold, as for instance cycle 35, composed of sub-sequences 36, 37, 38 . . . which is followed by pause 40. When optimal performance has been achieved, i.e. when the first time-derivative of the dynamical criterion H has become less than that of the sensitivity threshold, a set of optimalization cycles constituting a new sequence is periodically triggered off in order to compensate for a slow drift. If a disturbance appears, and exceeds a predetermined disturbance threshold and lasts longer than a predetermined length of time substantially equal to the significant time constant of the installation, a fresh optimalization cycle is triggered off in order to compensate the effect of this disturbance.

Figure 7:
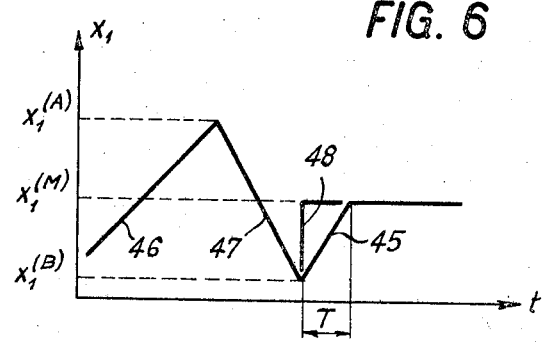
FIGURE 7 illustrates a particular procedure in relation with the method.

As stated earlier, the method brings in a set value to stop the variation of the actuating variable during its control subsequence as soon as it reaches this set value. To bring the actuating variable from the second memorized value to the set value, it can, as will appear from FIGURE 6, be made to continue to vary at the same speed as during previous variations. This is what is shown in greater detail in FIGURE 7 which is concerned with actuating variable $x_1$ taken by way of example and in which line 45 represents the evolution of actuating variable $x_1$ from its memorized value $x_1^{(B)}$ to its set value $x_1^{(M)}$. This line has the same slope as line 46, and, except for the sign, as line 47, which lines respectively represent the first and second variations of this actuating variable $x_1$. It would however be advantageous to bring the actuating variable more rapidly to its set value by subjecting it to an abrupt variation, for example that represented by line 48. This procedure, which is provided for, makes it possible to gain during each sub-sequence a time T, and hence to gain over a complete cycle a time $nT$, $n$ being the number of actuating variables governing the operation of the installation. This leads to greater control speed, the increase in speed being correspondingly greater when the number of action quantities is larger.

In the preceding description, the value of the first time-derivative of the dynamical operating criterion H was taken as basis to decide whether a cycle was to be repeated or not in the course of a sequence: if this time-derivative is greater than the sensitivity threshold, the control cycle is repeated, and if this derivative is less than the sensitivity threshold, the sequence is stopped. It is possible, however, to take as a basis the value of a time-derivative of higher order, for instance the derivative of the order two, or even the value of a combination of the different time derivatives of the dynamical operating criterion. H. It is also possible to take as a basis the difference between the value of the dynamical criterion H at the beginning of the cycle and its value at the end of the pause following this cycle, which difference is then compared with a sensitivity threshold: if this difference is greater than the threshold, a fresh control cycle is initiated and if this difference is less than the threshold, the sequence is stopped.

By way of example, apparatus will now be described for carrying out the above method. This apparatus is intended to ensure optimalizing control of an installation whose operation is governed by several actuating variables and whose optimal performance is defined by the minimum of an operating criterion.

Figure 8:
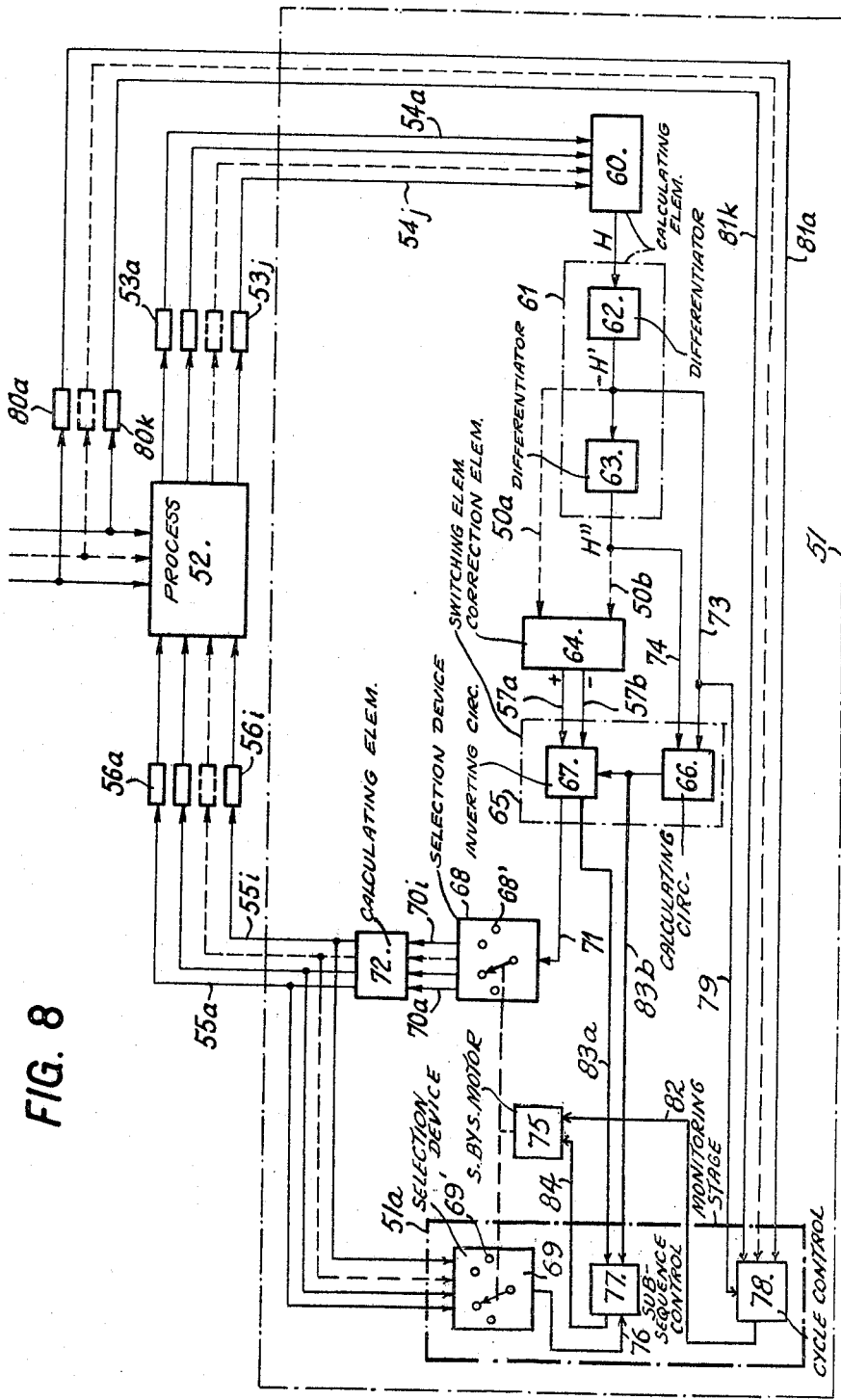
FIGURE 8 is a functional diagram of the apparatus and of the latter's connections with an industrial installation to be controlled.

FIGURE 8 depicts diagrammatically the control apparatus 51 connected to the industrial installation 52 through the intermediary of measuring devices $53a$ . . . $53j$ which transmit thereto, via lines $54a$ . . . $54j$, measurement signals representing the values of the measured physical quantities, and through the intermediary of lines $55a$ . . . $55i$ for transmitting to actuators $56a$ . . . $56i$ the time-integrals of the correction signals elaborated by the apparatus. Measuring elements $80a$ . . . $80k$ measure the disturbances on the installation 52 and transmit, via lines $81a$ . . . $81k$, signals representing these disturbances. The apparatus comprises:

A first calculating element 60 for elaborating from measurement signals transmitted by lines $54a$ . . . $54j$, a signal representing the value of the operating criterion H (final controlled variable);

A second calculating element 61, including differentiators 62 and 63 for respectively elaborating signals representing the first and second time-derivatives H' and H" of the operating criterion;

A correction element 64 for elaborating a correction signal which appears with a positive sign on a line 57a and with a negative sign on a line 57b. This correction signal may depend on the value either of the first time-derivative of the operating criterion, in which case the correction element 64 is connected to the differentiator 62 of the second calculating element 61 by a line 50a, or of the second time-derivative of the criterion, in which case the correction element 64 is connected to the differentiator 63 of the second calculating device 61 by a line 50b. This correction signal may also be constant, in which case neither lines 50a and 50b exist. The connections 50a and 50b are consequently optional and this is why they are shown in dotted lines;

A switching element 65 which includes a calculating circuit 66 and an inverting circuit 67, the calculating circuit 66 being connected to the second calculating element 61 by a line 74 and the inverting circuit 67 being connected by lines 57a and 57b to the correction device 64;

A first selection device 68 for feeding along several channels $70a$ . . . $70i$ the correction signal conveyed by a line 71 from the inverting circuit 67 of the switching element 65; this selection device is provided with a waiting stud 68';

A third calculating element 72 for elaborating a signal representing the time-integral of the correction signal transmitted by one of the channels $70a$ . . . $70i$ and for applying this integral signal to the end of the associated line $55a$ . . . $55i$;

A second selection device 69 which is controlled in synchronism with the first selection device 68 by a common step-by-step motor 75 and which successively and cyclically feeds along a feedback line 76 the signals generated by the third calculating element 72; this selection device also includes a waiting stud 69' which is reached at the same time as that of the first selection device 68;

A sub-sequence controlling device 77 which is inserted between the switching element 65, to which it is connected by lines 83a, 83b, and the step-by-step motor 75, to which it is connected by a line 84, and which receives the signals fed along the feedback line 76;

A cycle controlling device 78 which is connected to the first differentiator 62 of the second calculating element 61 by a line 79 and to the disturbance measuring elements 80a . . . 80k by lines 81a . . . 81k, and which controls via a line 82 the step-by-step motor 75.

As will be explained below, it is the second selection device 69, the sub-sequence controlling device 77 and the cycle controlling device 78 which form the means for implementing the controlling "strategy" described earlier. That is why these devices have, for purpose of clarity, been shown grouped together in the drawing into an arrangement 51a forming a "monitoring stage."

In the apparatus described by way of example, which is concerned with optimalizing control, it has been assumed that the control quantity, whose passages through zero from negative to positive defines the switching instants, was in the form $H''+\alpha H'$, i.e. a linear combination of the first and second time-derivatives of the dynamical operating criterion H. In such a case, the calculation circuit 66 of the switching element 65 includes (FIGURE 11) an operational amplifier 140 mounted as an adder which is connected, through the intermediary of a potentiometer 141, to the line 73 conveying the signal representing H', and, through the intermediary of an operational amplifier 142 mounted as an inverter, to the line 35 conveying the signal representing H''. The function of the inverter 142 is to reverse the sign of H'' which, along line 74, has a sign opposite to that of H' along line 73, and the potentiometer 141 serves to adjust the value of the coefficient $\alpha$, so that the signal which appears at the output of the adder 140 represents the control quantity $E=H''+\alpha H'$. This signal is fed along line 83b towards the sub-sequence control device 77 (FIGURE 8). As regards the inverting circuit 67, it is formed (FIGURE 11) by a Schmitt trigger 143, with the input thereof connected to the output of the adder 140, an astable multivibrator 144, a bistable multivibrator 145 and an inverting relay 146, controlled by a transistor 147 having a grounded emitter and a base connected to one of the two symmetrical outputs of the bistable multivibrator 145. The trigger 143, the multivibrators 144 and 145, and the transistor 147 are connected in cascade. The movable contact 148 of relay 146 connects line 71 either to line 57a conveying the positive correction signal, or to line 57b conveying the negative correction signal, depending on the conduction state of transistor 147. The trigger 143 is adapted to supply a signal of constant amplitude which is positive if its input is positive or negative if its input is negative; in other words it serves to form the signal representing the control quantity E. The astable multivibrator 144 produces a positive signal of constant amplitude when its input is negative, and, as long as its input is positive, a succession of alternately positive and negative impulses of constant amplitude which succeed one another at a given frequency $2f_0$. Finally, the bistable multivibrator 145 is adapted to change over only under the effect of its input polarity changes from positive to negative: it has two symmetrical outputs of which one is connected to the transistor 147 and the other is connected to line 83a leading the sub-sequence control device 77 (FIGURE 8).

Figure 9:
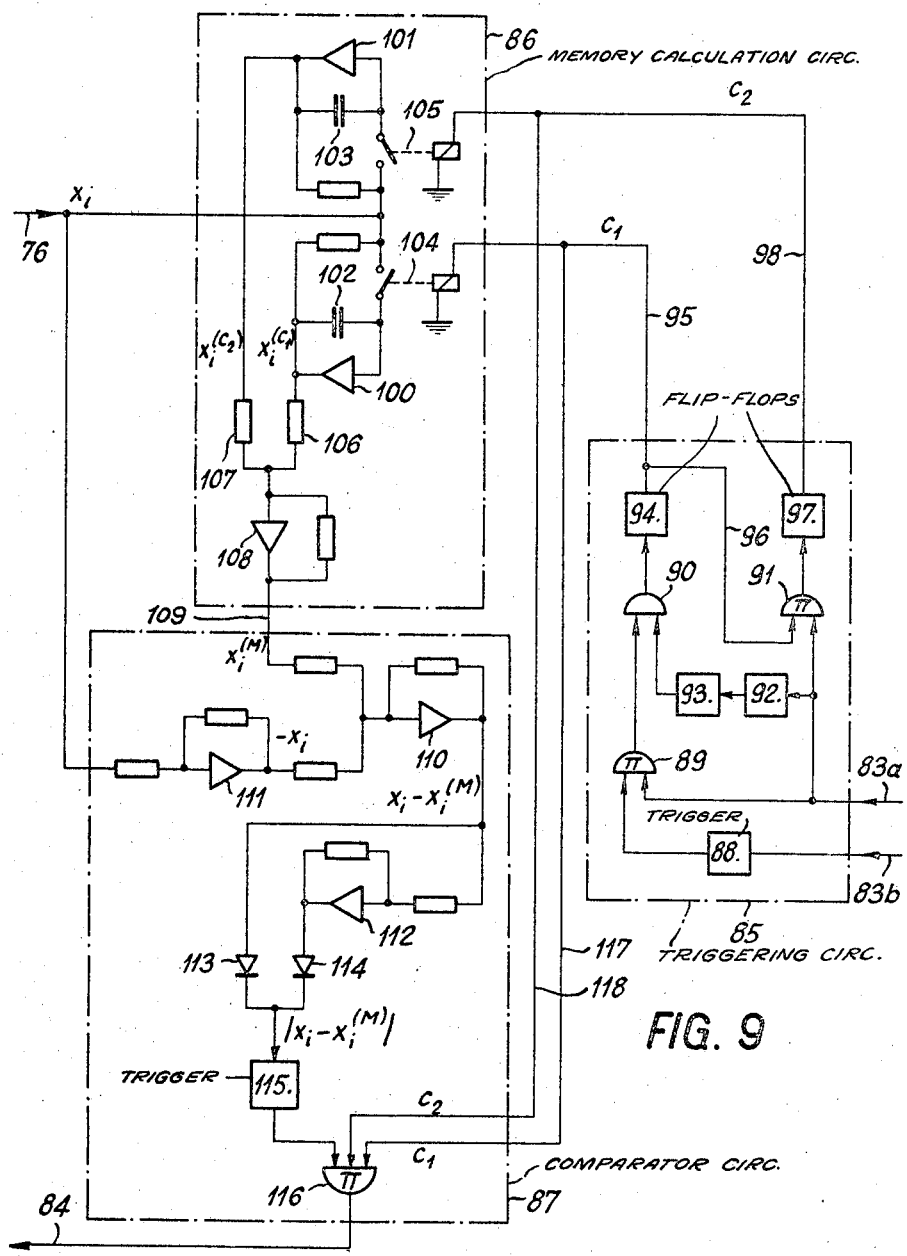

The sub-sequence control device 77 is represented in greater detail in FIGURE 9. It includes a triggering circuit 85 which is connected to lines 83a and 83b conveying the signals issuing from the switching element 65, a memory calculation circuit 86 adapted to produce a signal representing the set value, and a comparator circuit 87 adapted to produce, when the actuating variable reaches the set value, a so-called end of sub-sequence signal appearing in line 84 which feeds it to the step-by-step motor 75.

The triggering circuit 85 serves to identify, in accordance with the selected law of consideration, the first particular switching instant and to generate two control signals of which the first coincides with the first particular switching instant and the other coincides with the following switching instant. It will be assumed, in the described example, that this law is the law described above under letter (a), i.e. the law according to which, if the first variation is unfavourable (control quantity E being positive), the first particular switching instant is that which follows the second variation and, if this first variation is favorable (control quantity E being negative), the first partcular switching instant is that which follows this first variation. In such a case, the triggering circuit 85 includes a forming stage 88, e.g. a Schmitt trigger, which supplies a zero signal if its input is positive and a $+1$ signal if its input is negative, and which is connected via line 83b to the output of the calculation circuit 66 of the switching element 65, and an "AND" logic circuit 89 having one input connected to stage 88 and the other input connected, via line 83a, to the inverting circuit 67 of the switching element 65. It includes moreover an "OR" logic circuit 90 and an "AND" logic circuit 91 having each two inputs. The first input of the "OR" circuit 90 is connected to the output of the "AND" circuit 89 and its second input is connected, through the intermediary of two flip-flop circuits 92 and 93, to line 83a. The output of the "OR" circuit 90 is connected, through the intermediary of a flip-flop circuit 94, to a line 95 which feeds to the memory calculating circuit 86 a first control signal. The output of the flip-flop circuit 94 is connected by a line 96 to one of the inputs of the "AND" circuit 91, whereas the other input of the latter is connected to line 83a. The output of the "AND" circuit 91 is finally connected through the intermediary of a flip-flop circuit 97 to a line 98 which conveys a second control signal to the memory calculating circuit 86.

The memory calculating circuit 86 includes two operational amplifiers 100 and 101 across which are connected capacitors 102 and 103 respectively. The inputs of these operational amplifiers are connected, through the intermediary of relay actuated switches 104 and 105, to the feedback line 76. These relay actuated switches 104 and 105 are controlled by the triggering signals generated by the triggering circuit 85 and transmitted by lines 95 and 98: they are closed in the absence of triggering signals along lines 95 and 98 and open as soon as such signals appear therealong. The amplifiers 100 and 101 thus form, together with capacitors 102 and 103, analog memories which memorize the values reached by the signal conveyed by the feedback line 76 when the triggering signals appear. The outputs of memories 100 and 101 are connected through the intermediary of resistors 106 and 107 to an adder 108. The values of these resistors are so chosen that the signal appearing at the output 109 of the adder 108 will represent the arithmetical mean of the signals issuing from memories 100 and 101.

The comparator circuit 87 includes an adder 110 which is connected to the output 109 of the memory calculating circuit 86 and, through the intermediary of a reverser 111, to the feedback line 76. The output of this adder is connected to a unit consisting of an inverter 112 and of two rectifiers 113 and 114, which unit is adapted to elaborate the absolute value of the signal generated by the adder 110. The output of this unit is connected through the intermediary of a forming stage 115, e.g. a Schmitt trigger, to one of the inputs of an "AND" logic circuit 116 of which the other two inputs are respectively connected by lines 117 and 118 to the outputs 95 and 98 of the triggering circuit 86 so as to receive the triggering signals generated by the latter. The output of this "AND" circuit 116 is connected to line 84 which conveys the advancement signal generated by the latter to the step-by-step motor 75 (FIGURE 8).

The cycle control device 78, represented in detail in FIGURE 10, includes as input devices a comparator 120, connected to line 79 coming from derivator 62 (FIGURE 8) and conveying the signal representing the first time-derivative of the operating criterion, and a group of comparators $121a \ldots 121k$ respectively connected to lines $81a \ldots 81k$ coming from the disturbance measuring devices $80a \ldots 80k$ (FIGURE 8) and conveying the signals representing the disturbances.

These comparators are provided with means for setting the respective threshold values, diagrammatically depicted by line 122, representing the sensitivity threshold setting, and by lines $123a \ldots 123k$ representing the disturbance threshold settings. The outputs of comparators 120, and $121a \ldots 121k$ are respectively connected by lines 124 and $125a \ldots 125k$, which convey the signals representing the results of the comparisons, to a first "OR" logic circuit 126. The output of the latter is connected by a line 127 to a second "OR" logic circuit 128, which, in addition, receives via a line 129 the signals generated by a clock generator 130. The output of this second "OR" circuit 128 is connected via a line 131 to a time-delay circuit 132 which, after a given time delay, connects line 131 to line 82 so that the latter will feed to the step-by-step motor 75 (FIGURE 8) the signals issuing from this second "OR" circuit 128. These signals are moreover conveyed by a line 133 to the zero resetting terminal of the clock generator 130. Further, a switch 134 and a line 135 connect a voltage source, not shown and connected to a terminal 136, to line 82.

The apparatus operates as follows:

The correction signal, elaborated by the correction device 64 (FIGURE 8), is transmitted to the first selection device 68 by the switching element 65 which reverses the sign thereof at instants defined by the given switching law, i.e., in the described example, each time the control quantity E passes through zero from negative to positive, and, when this control quantity E remains positive, at periodically repeating instants. If the signal, formed by trigger 143 (FIGURE 11), representing this control quantity, is negative, the astable multivibrator 144 supplies a positive signal; as soon as this control quantity becomes positive, this astable multivibrator 144 supplies a negative signal. This change of polarity, from negative to positive, causes the bistable multivibrator 145 to change over: the sign of the signal applied to the base of transistor 147 reverses, thereby modifying the conduction state of the latter, so that relay 146 passes from one position to the other while causing the sign of the correction signal transmitted by line 71 to change. When control quantity E becomes negative again, the output of the astable multivibrator 144 becomes positive again but the relay 146 does not react since the bistable multivibrator 145 does not respond to a change in polarity of its input from negative to positive. If the control quantity E remains positive, the $2f_o$ frequency impulse state of the astable multivibrator 144 is initiated and the relay changes over at frequency $f_o$ to produce a series of sign reversals of the correction signal transmitted by line 71. At each reversal, there is a polarity reversal in line 83a, so that the sub-sequence control device 77 (FIGURES 8 and 9) is informed of each switching operation. Moreover, it is informed via line 83b about the sign of the control quantity. If the actuating variable variation is favourable, line 83b transmits a negative signal and the "AND" circuit 89 of the triggering circuit 85 (FIGURE 9) receives a signal $+1$ at its first input. As soon as it receives at its second input, via line 83a, information to the effect that the switching element has reversed the sign of the correction signal, it supplies a $+1$ signal to the input of the "OR" circuit 90, which causes the flip-flop circuit 94 to change over: this change-over action causes the polarity of line 95 to change from negative to positive and this polarity change in turn causes, through opening of the switch 104 of the memory calculation circuit 86 (FIGURE 9), memorization of the value $x_i^{(C_1)}$ reached by the action quantity $x_i$ at this switching instant, which value is transmitted to the memory calculation circuit 86 by the second selection device 69 and by the feedback line 76. At the next switching instant, the "AND" circuit 91, whose input, connected to flip-flop circuit 94 by line 96, is positive, receives the signal conveyed by line 83a: it triggers flip-flop circuit 97, thereby changing the polarity of line 98 and bringing about, by opening switch 105 of the memory calculation circuit, memorization of the value $x_i^{(C_2)}$ at this second switching instant.

If the initial variation of the actuating variable is unfavourable, line 83b transmits a positive signal to produce a zero signal at the first input of the "AND" circuit 89. The first switching impulse, conveyed by line 83a, is not transmitted by the "AND" circuit 89, but causes flip-flop circuit 92 to change over. At the second switching instant, flip-flop circuit 92 changes over again, thereby causing flip-flop circuit 93 to change over also, and brings about a change of polarity in line 95. This polarity change, which takes place whatever the polarity of line 83b and hence independently of the favourable or unfavourable nature of the second variation of the action quantity, thus brings about memorization of the value reached at the second switching instant, whatever the nature, i.e. favourable or unfavourable, of the second actuating variable variation. At the next switching instant it is, as before, the "AND" circuit 91 which acts: it feeds into line 98 the signal bringing about memorization of the value reached by the actuating variable at the third commutation instant.

As will be appreciated, the signals along lines 95 and 98 reflect the adopted law of memorization, the tenor of which has been indicated above.

From the significance values $x_i^{(C_1)}$ and $x_i^{(C_2)}$ thus memorized by memories 100 and 101 as soon as the control signals $C_1$ and $C_2$ appear, the adder 108 elaborates the arithmetical mean $x_i^{(M)} = [x_i^{(C_1)} + x_i^{(C_2)}]$. This mean $x_i^{(M)}$, which is the set value that must be reached by variable $x_i$ before the corresponding sub-sequence comes to a stop, is added by adder 110 to the value $-x_i$ produced by the reverser 111 from the value $x_i$ transmitted by the feedback line 76. This adder thus supplies a signal representing $[x_i - x_i^{(M)}]$. From this signal, the unit 112, 113 and 114 elaborates the absolute value $|x_i - x_i^{(M)}|$, which absolute value is returned by the forming stage 115 in the form of a $+1$ signal when it is substantially equal to zero, and in the form of a zero signal when it differs from zero. The "AND" circuit 116 is provided for safety reasons and only transmits the $+1$ signal issuing from the forming stage 115 when signals $C_1$ and $C_2$ are present, i.e. it ensures that this $+1$ signal effectively results from an equality between variable $x_i$ and set value $x_i^{(M)}$.

This $+1$ signal constitutes an advance signal which is transmitted by line 84 to the step-by-step motor 75. As soon as this signal appears, the selection devices 68 and 69 move forward by one step: the sub-sequence relating to $x_i$ is stopped and the sub-sequence relating to $x_{i+1}$ begins, the operations for this new sub-sequence taking place in the same manner as the operations for the sub-sequence that has just been described. The advance signal thus also acts as a sub-sequence stopping signal.

When the movable contacts of selection devices 68 and 69 have swept across all of the sub-sequence initiating studs, the apparatus has carried out a control cycle. The end of the cycle is determined by the arrival of the movable contacts on waiting studs $68'$ and $69'$ so that, as from that moment, the actuating variables $x_i$ are all maintained equal to their respective set values $x_i^{(M)}$. The cycle remains at a stop until the cycle control device 78 triggers off a fresh cycle or a fresh sequence.

The cycle control device 78 receives, via line 79, the signal representing the first time-derivative H' of the dynamical operating criterion H. The comparator 120 (FIGURE 10) compares the value of this signal to that of the sensitivity threshold previously set by line 122. If this signal is greater than the threshold value, which indicates that the test on the first time-derivative of the operating criterion shows an unfavourable result, there appears a +1 signal at the input 124 of the "OR" circuit 126, which circuit feeds a +1 signal to the input 127 of the "OR" circuit 128 and the latter in turn feeds a +1 signal to the input of the time delay circuit 132. The latter, after a predetermined time delay, transmits the signal appearing at the output of the "OR" circuit 128 to line 82 which conveys it to the step-by-step motor 75 (FIGURE 8); this signal causes the advance of the selection devices 68 and 69 whose movable contacts shift to the terminals corresponding to the first actuating variable $X_1$ and a fresh cycle begins. As is apparent, the signal conveyed by line 82 is a control signal which triggers off the beginning of a cycle.

In the presence of a zero signal at the input 127 (FIGURE 10) of the "OR" circuit 128, it is the periodic signals issuing from the clock generator 130 which, at fixed intervals, trigger off the first cycle of a fresh sequence. The reason for this is to make a periodic check to see that the installation is properly controlled and that a slow drift has not shifted the installation from the desired performance, i.e., in the described example, from optimal performance. Each time a fresh sequence has been triggered off, the clock generator is returned to zero by the signal conveyed by line 133.

If a disturbance were to appear and if the signal, that represents its value and which is transmitted via one of lines $81a \ldots 81k$, were to exceed the disturbance threshold represented by the voltage applied to the lines $123a \ldots 123k$, the corresponding comparator $121a \ldots 121k$ elaborates a +1 signal at one of the inputs $125a \ldots 125k$ of the "OR" circuit 126. The latter transmits this signal, through the intermediary of the "OR" circuit 128 and line 131, to the time delay circuit; the latter feeds to line 82 the signal existing in line 131 at the end of the time delay. Thus, a disturbance having a value exceeding the disturbance threshold and which lasts longer than the time delay gives rise to a control signal which triggers off the first cycle of a fresh sequence.

Finally, the switch 134 makes it possible to trigger off manually a sequence by feeding to line 82 a control signal from the source connected to terminal 136.

As will be realised, the above described apparatus ensures, in the particular case of optimalizing control of an industrial installation with minimal optimum, a control in accordance with the method described earlier. In order that this apparatus may be capable of ensuring a control other than an optimalizing control, it suffices to adapt the switching element 65 (FIGURES 8 and 11) to the specific switching law that applies to the selected control. Similarly, if it is desired to bring into action a law of memorization other than the law (a) on which the described apparatus is based, the diagram of the triggering circuit 85 (FIGURE 9) of the sub-sequence controlling device 77 (FIGURE 8) must be adapted. As regards the test made by the apparatus at the end of the pause following a cycle, use has been made, in the described example, of the particular test that is based on the value of the first time-derivative H' of the dynamical operating criterion, and which consists in comparing the value of this time-derivative to a sensitivity threshold. If another test is resorted to, the cycle controlling device must consequently be modified. For example, if it is decided to make a test on the second time-derivative H'' of the dynamical operating criterion, the line 79 (FIGURE 8) must be connected not to the output of the differentiator 62, but to the output of the differentiator 63.

If it is decided to make a test on a combination of these time-derivatives or on a given function of the dynamical operating criterion, line 79 must be connected to a calculating element adapted to elaborate this combination or this function.

What is claimed is:

1. An apparatus for oscillatory control of an industrial installation the operation of which is governed by actuating variables and is defined by a final controlled variable depending on physical quantities measured on said installation, said apparatus being connectable to said installation through measuring elements arranged to supply signals representing the value of the measured quantities and the value of disturbances and through the intermediary of actuators arranged to vary the actuating variables, and said apparatus comprising a first calculation element capable of elaborating from said measured quantities the instantaneous value of the final controlled variable, a second calculation element capable of elaborating the value of the successive time-derivatives of said instantaneous value of the final controlled variable to at least the order two, a correction element capable of elaborating a correction signal representing the speed of variation of each of said actuating variables, a stepping motor, a selection device controlled by said stepping motor and capable of conveying said correction signal along different paths each ending at one of said actuators, a switching element having a calculation circuit capable of determining from said time-derivatives the consecutive switching instants at which the sign of said correction signal should be reversed and a reversing circuit capable of carrying out this reversal at said switching instants, and a third calculation element capable of elaborating the time-integral of said correction signal, said apparatus further including a monitoring stage comprising:

a second selection device having its advance controlled in synchronism with that of the first said selection device and being adapted to take up the signals generated by said third calculation element and to convey said signals along a feedback line;

a sub-sequence controlling device which causes said stepping motor to advance and which comprises: a triggering circuit connected to said switching element and arranged to generate a control signal at each of said particular switching instants; a memory calculation circuit connected to said feedback line and to said triggering circuit and arranged to memorize the significant values reached by the actuating variable when said control signals appear and to elaborate a set value equal to a linear combination of said significant value; and a comparing circuit connected to said feedback line, to said memory calculation circuit and to said triggering circuit, and arranged to generate, when the actuating variable reaches said set values, an end of sub-sequence signal causing the stepping motor to advance by one step, thereby to initiate a fresh regulating sub-sequence;

and a cycle controlling device which initiates the starting of said stepping motor and which comprises: a series of threshold comparators with at least one of said comparators having its input connected to said second calculation element and with the remainder of said comparators having their inputs connected to said disturbance measuring elements; a timer supplying periodic signals; a first OR element whose inputs are connected to said threshold comparators; a second OR element having one input connected to the output of said first OR element and having its other input connected to the output of said timer; and a time delay circuit which is connected to the output of said second OR element and which is capable of supplying, with a delay equal to its time delay, a cycle or sequence triggering signal causing stepping motor to be started, thereby to initiate a fresh regulating cycle or sequence.

2. Apparatus according to claim 1, wherein said one comparator of said cycle controlling device is connected to the input of said second calculation element in such a manner as to receive a signal representing the instantaneous value of said final controlled variable.

3. Apparatus according to claim 1, wherein said one comparator of said cycle controlling device is connected to said second calculation element in such a manner as to receive a signal representing the time-derivative of order one of the instantaneous value of said final controlled variable.

4. Apparatus according to claim 1, wherein said one comparator of said cycle controlling device is connected to said second calculation element in such a manner as to receive a signal representing a linear combination of the time-derivative of order one and of the time-derivative of order two of the instantaneous value of said final controlled variable.

5. Apparatus according to claim 1, wherein said memory calculation circuit is arranged to elaborate said set value as the arithmetic mean of said significant values.

6. Apparatus according to claim 1, wherein the time delay of said time delay circuit is substantially equal to the time constant of said industrial installation.

References Cited

UNITED STATES PATENTS

| | | | |
|---|---|---|---|
| 2,628,606 | 2/1953 | Draper et al. | 235—150.1 XR |
| 2,995,301 | 8/1961 | Seliger et al. | 235—150.1 |
| 3,070,301 | 12/1962 | Sarnoff | 235—150.1 |
| 3,346,726 | 10/1967 | Rouxel et al. | 235—150.1 |

EUGENE G. BOTZ, Primary Examiner

U.S. Cl. X.R.

235—117; 307—235

UNITED STATES PATENT OFFICE
CERTIFICATE OF CORRECTION

Patent No. 3,480,765                                  November 25, 1969

Roland Rouxel et al.

It is certified that error appears in the above identified patent and that said Letters Patent are hereby corrected as shown below:

In the heading to the printed specification, lines 5 to 8, "assignors to Battelle Memorial Institute, International Division Compagnie Francaise Thomson-Houston, Geneva, Switzerland, a corporation of Switzerland" should read -- assignors to Battelle Memorial Institute, International Division, Geneva, Switzerland, a corporation of Switzerland and Compagnie Francaise Thomson-Houston, Paris, France, a corporation of France --.

Signed and sealed this 17th day of November 1970.

(SEAL)

Attest:

Edward M. Fletcher, Jr.

Attesting Officer

WILLIAM E. SCHUYLER, JR.
                                                           Commissioner of Patents